(12) United States Patent
Sinha

(10) Patent No.: US 10,303,806 B2
(45) Date of Patent: May 28, 2019

(54) METHOD AND SYSTEM FOR PROVIDING CONCURRENT BUFFER POOL AND PAGE CACHE

(71) Applicant: Sachin Sinha, Bangalore (IN)

(72) Inventor: Sachin Sinha, Bangalore (IN)

( * ) Notice: Subject to any disclaimer, the term of this patent is extended or adjusted under 35 U.S.C. 154(b) by 364 days.

(21) Appl. No.: 14/829,496

(22) Filed: Aug. 18, 2015

(65) Prior Publication Data

US 2016/0055195 A1    Feb. 25, 2016

(51) Int. Cl.
*G06F 17/30* (2006.01)
*G06F 12/00* (2006.01)

(52) U.S. Cl.
CPC ........ *G06F 17/30902* (2013.01); *G06F 12/00* (2013.01); *G06F 17/3048* (2013.01); *G06F 17/3056* (2013.01)

(58) Field of Classification Search
None
See application file for complete search history.

(56) References Cited

U.S. PATENT DOCUMENTS

| | | | | |
|---|---|---|---|---|
| 5,414,840 | A * | 5/1995 | Rengarajan | G06F 17/30362 |
| 5,455,944 | A * | 10/1995 | Haderle | G06F 9/466 |
| 2008/0065644 | A1 * | 3/2008 | Pasupuleti | G06F 17/30551 |
| 2012/0323971 | A1 * | 12/2012 | Pasupuleti | G06F 17/30306 707/802 |

* cited by examiner

*Primary Examiner* — Sangwoo Ahn
(74) *Attorney, Agent, or Firm* — Kolisch Hartwell, P.C.

(57) ABSTRACT

The present disclosure provides a method for providing concurrent one or more buffer pools associated with a database of a database management system is provided. The method includes creating one or more tables in each of the one or more buffer pools at runtime, receiving a request simultaneously from a corresponding plurality of users for accessing a page of a plurality of pages stored in a buffer pool of the one or more buffer pools and enabling each of the plurality of users to access the corresponding page of the plurality of pages concurrently. Each of the one or more tables is a lockless table. Each of the one or more tables includes a plurality of lockless slots. The plurality of pages is requested from a corresponding slot of the plurality of lockless slots in a corresponding table of the one or more tables in the buffer pool.

20 Claims, 10 Drawing Sheets

METHOD AND SYSTEM FOR PROVIDING CONCURRENT BUFFER POOL AND PAGE CACHE

TECHNICAL FIELD

The present disclosure relates to the field of database management systems. More specifically, the present disclosure relates to providing a concurrent buffer pool and page cache in the database management systems.

BACKGROUND

With the advent of technological advancements, huge amount of digital data is generated every day from a variety of sources. These sources can be the companies/firms/corporations/government bodies/banks/retail chains involved in the online and offline business which utilizes technology as a part of their business. These sources want to analyze the data on a regular basis in order to ensure a continuous and smooth running of systems as well as to have in-depth insights. This kind of data is known as big data which has become a latest trend across many areas of business and technology.

In general, the data is processed by traditional processing systems for performing one or more tasks. The existing database systems keep a track of the data, store the data, and continuously update the data in regular intervals of time and so on. These database management systems handles millions of transactions and millions of requests on day to day basis. These database management systems employ complex algorithms to look for repeatable patterns while handling the data with an extended amount of metadata. Furthermore, these database management systems are employed in various sectors including banking sector, e-commerce sector, industrial sector and the like which require continuous processing of the data in order to ensure smooth running of business.

Moreover, these database management systems manage the data efficiently and allow users to perform tasks with utmost ease. In addition, the database management systems increase the efficiency of business operations and overall costs. Further, the database management systems are located in a non-volatile storage of various systems. Examples of the database management systems include Oracle, Microsoft SQL Server, Sybase, Ingress, Informix and the like. The database management system is stored on a database associated with a disk storage system such as a hard disk drive or solid state drive. The database is an organized collection of schemes, tables, queries, reports, views and other objects.

In general, the database is an organized collection of schemes, tables, queries, reports, views and other objects. The database can be stored on a stable storage system like a hard disk and placed in a remote or local area along with a network. The database can be accessed, edited and updated through a server that transfers the requests to the processor associated with the database. Moreover, the database management system handles request from various client machines. In addition, the database management systems make one or more changes in response to the requests.

Going further, the database management systems store the data in memory for continuous use in future. Moreover, as technology and computing is evolving, need for more refined data, memory and process handling algorithms and techniques are required at developer end to bridge the gap of inefficient, delayed, failed transfer and commit of records in the database. The huge amount of data needs to be stored in the database and at the same time required for future purposes also in order to increasing performance of applications. However, there is a limit to an amount of the data that can be stored depending on the memory space in the database due to which some amount of data is consistently flushed from the disk to intake new data. This problem is addressed by using a mechanism for caching the data into a volatile memory associated with the database.

The data is consistently cached into a random access memory for temporary storage of the data. Moreover, the data is cached for responding to requests from the client machines swiftly by reading the data pre-stored in the random access memory. This data corresponds to a recently accessed data by the users. In addition, the random access memory includes one or more buffer pools for reading and storing the data. As known in the art, a buffer pool is a place in system memory or a disk that is used for caching table and index data pages as they are modified or read from the disk. Further, the buffer pool caches disk blocks to optimize block I/O. Furthermore, the primary purpose of the buffer pool is to reduce database file input/output (I/O) and improve the response time for data retrieval. The database writes the data in form of pages into the buffer pool.

Typically, only clean pages are written into the buffer pool for minimizing the risk of data loss. In addition, the buffer pool may be associated with a single database and may be used by more than one table space. Moreover, the buffer pool space is allocated based on the requirement of the user. Further, an adequate buffer pool size is essential for good database performance as it reduces disk I/O which is the most time consuming operation. Large buffer pools also have an effect on query optimization as more of the work can be done in memory.

Going further, the buffer pools take decision of flushing pages from the memory to the database when the size of the data pages stored in the memory increases the size of the buffer pool. Moreover, the buffer pool is configured for keeping only a relevant portion of the data in the buffer pool. In addition, it is important that access to the buffer pool should be easy. In simpler terms, the buffer pool should be highly concurrent for allowing multiple users to access the pages simultaneously. However, if the access to the buffer pool is not smooth, efficient or fast, then the seek time for accessing the pages is considerably increased even though the pages are present in the buffer pool due to pre-fetching techniques.

Furthermore, it is highly essential that the buffer pool allows multiple users to access different data and serve that data to the users in a parallel fashion. Moreover, data structure of the buffer pool should be such that overhead of managing the overall buffer pool is minimum. In addition, the buffer pool maintains a table in the memory whose size is computed when the database is started based on certain parameters. Moreover, the buffer pool contains multiple lists namely least recently used list, dirty page list and a free list. The multiple lists handle the access to the pages stored in the buffer pool, writing on the pages and flushing the pages back to the database. Further, the buffer pool manages the pages by using some metadata and keeping the metadata in a header. The headers are linked in the table or the list recently used list or the free list or the dirty page list. Moreover, the metadata contains location information of the page, an offset of a file system for the data page or index page, a block number and the like.

Further, the memory of the buffer pool is divided into various slots for managing the pages using the page size in a sequential manner. The metadata header is linked to the slots in the buffer pool. The access to the pages is only possible through the table created by the buffer pool and then from the header and then the pages are accessed through the header. Moreover, the table created by the buffer pools gets locked when a particular user access any page which restricts other users to read any different page. In addition, a particular slot in the table corresponding to the page gets locked as well. Further, the slot contains multiple other headers which are also locked when the page is accessed from a particular header. For example, if a user A is accessing a page 1 and header for the page 1 is linked with a slot 30, the slot 30 is locked and the user A gets access to the page 1 but a user B trying to access a page 10 is not allowed to access the page 10 is contained in the slot 30 which is presently locked and the user B has to wait until the slot 30 is unlocked.

In addition, the efficiency of the buffer pool is decreased by a great extent. Moreover, the concurrency of the buffer pool is low which decreases the parallel processing and leads to degradation in performance of the buffer pool. Further, the locking of the table and the slots does not allow multiple users to access different pages simultaneously. Furthermore, the present systems and methods do not differentiate between when the user wants to write on the page and when the user wants to read the page which decreases the performance of the buffer pool. In addition, the present systems and methods do provide a lockless table for allowing multiple users to access the pages simultaneously.

In light of the above stated discussion, there is a need for a method and system that overcomes the above stated disadvantages and provides a more concurrent buffer pool.

SUMMARY

In an aspect of the present disclosure, a computer-program product for providing concurrent one or more buffer pools associated with a database of a database management system is provided. The computer-program product includes a computer readable storage medium having a computer program stored thereon for performing the steps of creating one or more tables in each of the one or more buffer pools at runtime, receiving a request simultaneously from a corresponding plurality of users for accessing a page of a plurality of pages stored in a buffer pool of the one or more buffer pools and enabling each of the plurality of users to access the corresponding page of the plurality of pages concurrently. Each of the one or more tables is a lockless table. Each of the one or more tables includes a plurality of lockless slots. The request is received in form of a query. The plurality of pages is requested from a corresponding slot of the plurality of lockless slots in a corresponding table of the one or more tables in the buffer pool. Concurrent access is provided by locking each of a plurality of buffer headers. Each buffer header of the plurality of buffer headers corresponds to the page of the plurality of pages requested by a corresponding user of the plurality of users. Each buffer header is individually locked for allowing each of the plurality of users to access the corresponding page of the plurality of pages concurrently.

In an embodiment of the present disclosure, each of the plurality of pages is accessed through one or more lists in the buffer pool. The one or more lists include a least recently used list, a dirty page list and a free list.

In another embodiment of the present disclosure, each of the one or more lists is accessed by the plurality of users concurrently.

In an embodiment of the present disclosure, the computer-program product further includes allowing each of the plurality of users to read a similar page in the buffer pool concurrently.

In another embodiment of the present disclosure, the concurrent access to the similar page is provided based on a pre-determined criterion.

In yet another embodiment of the present disclosure, the pre-determined criterion includes identifying whether the similar page is accessed for reading or writing.

In an embodiment of the present disclosure, the computer-program product further includes computing a size of the buffer pool. The size is computed for the creation of the one or more tables in the buffer pool.

In an embodiment of the present disclosure, the computer-program product further includes adding the plurality of pages in the dirty page list. In another embodiment of the present disclosure, the plurality of pages is added when each of the plurality of pages are determined as dirty pages. In yet another embodiment of the present disclosure, the plurality of pages is added when a pervious buffer is not null.

In another aspect of the present disclosure, a method for providing concurrent one or more buffer pools associated with a database of a database management system is provided. The method includes creating one or more tables in each of the one or more buffer pools at runtime, receiving a request simultaneously from a corresponding plurality of users for accessing a page of a plurality of pages stored in a buffer pool of the one or more buffer pools and enabling each of the plurality of users to access the corresponding page of the plurality of pages concurrently. Each of the one or more tables is a lockless table. Each of the one or more tables includes a plurality of lockless slots. The request is received in form of a query. The plurality of pages is requested from a corresponding slot of the plurality of lockless slots in a corresponding table of the one or more tables in the buffer pool. Concurrent access is provided by locking each of a plurality of buffer headers. Each buffer header of the plurality of buffer headers corresponds to the page of the plurality of pages requested by a corresponding user of the plurality of users. Each buffer header is individually locked for allowing each of the plurality of users to access the corresponding page of the plurality of pages concurrently.

In an embodiment of the present disclosure, each of the plurality of pages is accessed through one or more lists in the buffer pool. The one or more lists include a least recently used list, a dirty page list and a free list.

In another embodiment of the present disclosure, each of the one or more lists is accessed by the plurality of users concurrently.

In an embodiment of the present disclosure, the method further includes allowing each of the plurality of users to read a similar page in the buffer pool concurrently.

In another embodiment of the present disclosure, the concurrent access to the similar page is provided based on a pre-determined criterion.

In yet another embodiment of the present disclosure, the pre-determined criterion includes identifying whether the similar page is accessed for reading or writing.

In an embodiment of the present disclosure, the method further includes computing a size of the buffer pool. The size is computed for the creation of the one or more tables in the buffer pool.

In yet another aspect of the present disclosure, a method for providing concurrent one or more buffer pools associated with a database of a database management system is provided. The method includes creating one or more tables in each of the one or more buffer pools at runtime, receiving a request simultaneously from a corresponding plurality of users for accessing a page of a plurality of pages stored in a buffer pool of the one or more buffer pools, enabling each of the plurality of users to access the corresponding page of the plurality of pages concurrently and allowing each of the plurality of users to read a similar page in the buffer pool of the one or more buffer pools concurrently based on a pre-determined criterion. Each of the one or more tables is a lockless table. Each of the one or more tables includes a plurality of lockless slots. The request is received in form of a query. The plurality of pages is requested from a corresponding slot of the plurality of lockless slots in a corresponding table of the one or more tables in the buffer pool. Concurrent access is provided by locking each of a plurality of buffer headers. Each buffer header of the plurality of buffer headers corresponds to the page of the plurality of pages requested by a corresponding user of the plurality of users. Each buffer header is individually locked for allowing each of the plurality of users to access the corresponding page of the plurality of pages concurrently. The pre-determined criterion includes identifying whether the similar page is accessed for reading or writing.

In an embodiment of the present disclosure, each of the plurality of pages is accessed through one or more lists in the buffer pool. The one or more lists include a least recently used list, a dirty page list and a free list.

In another embodiment of the present disclosure, each of the one or more lists is accessed by the plurality of users concurrently.

BRIEF DESCRIPTION OF THE FIGURES

Figure 1:
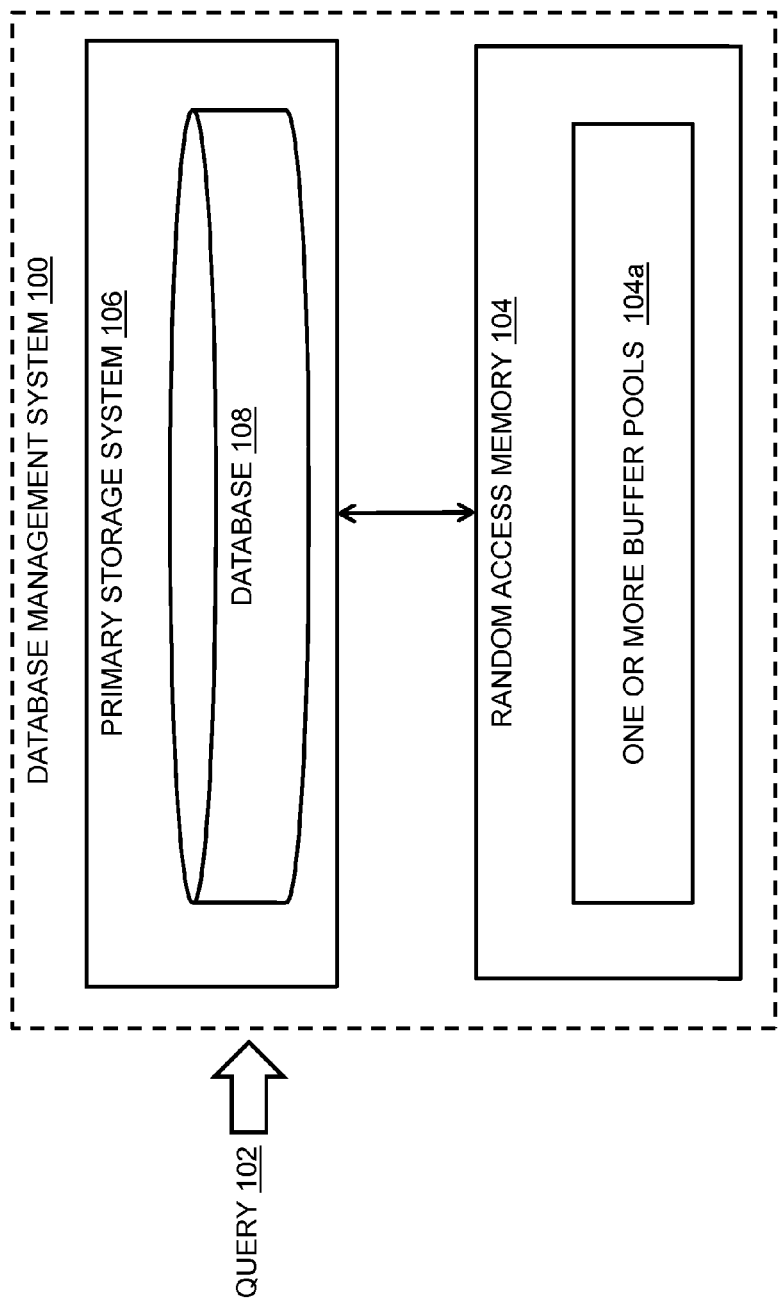
Figure 2:
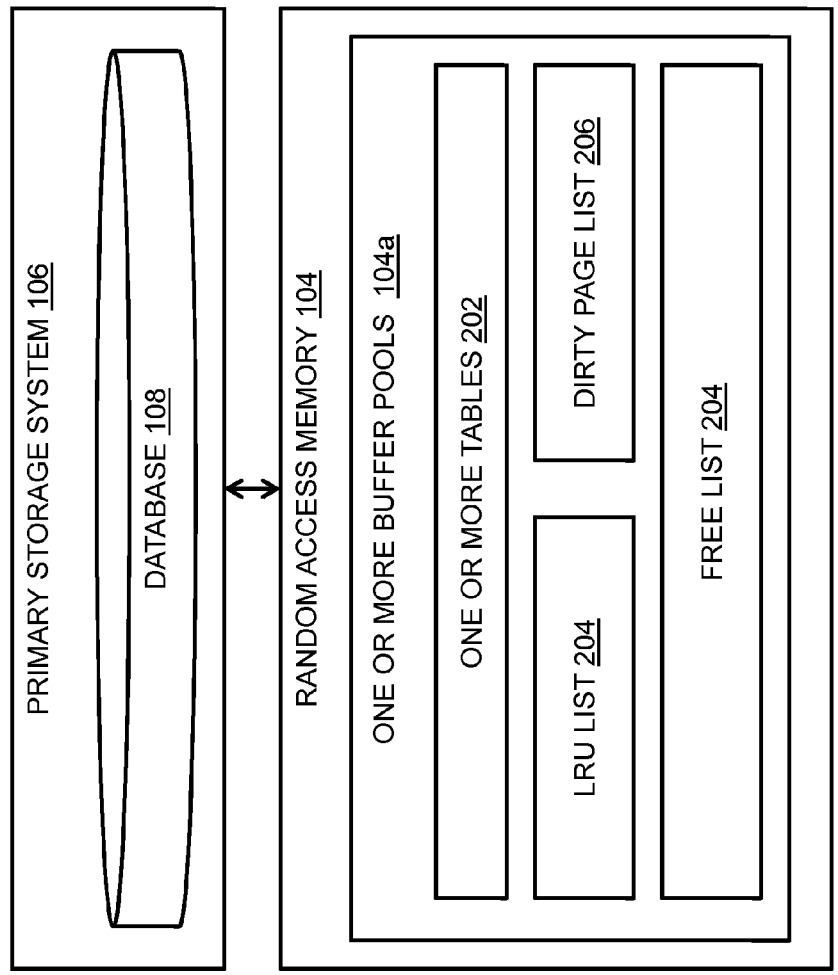
Figure 3:
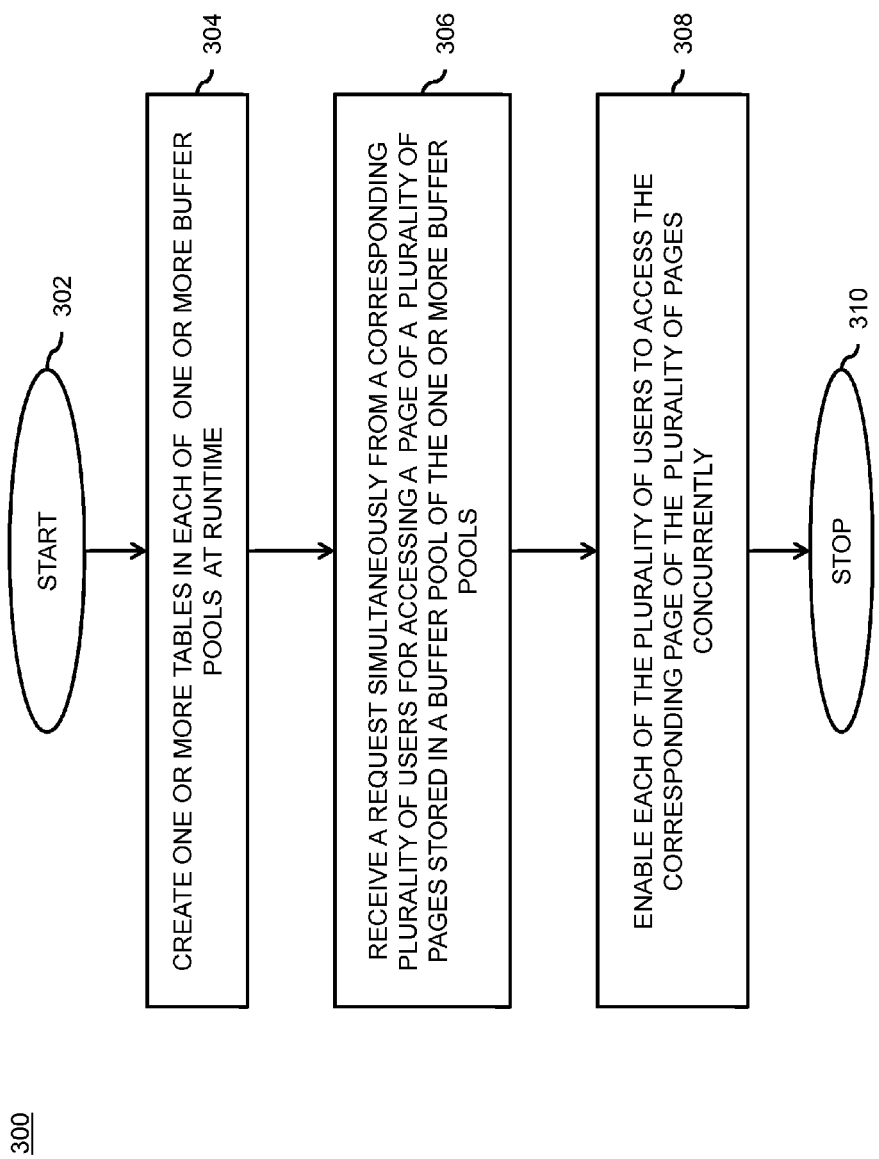
Figure 4:
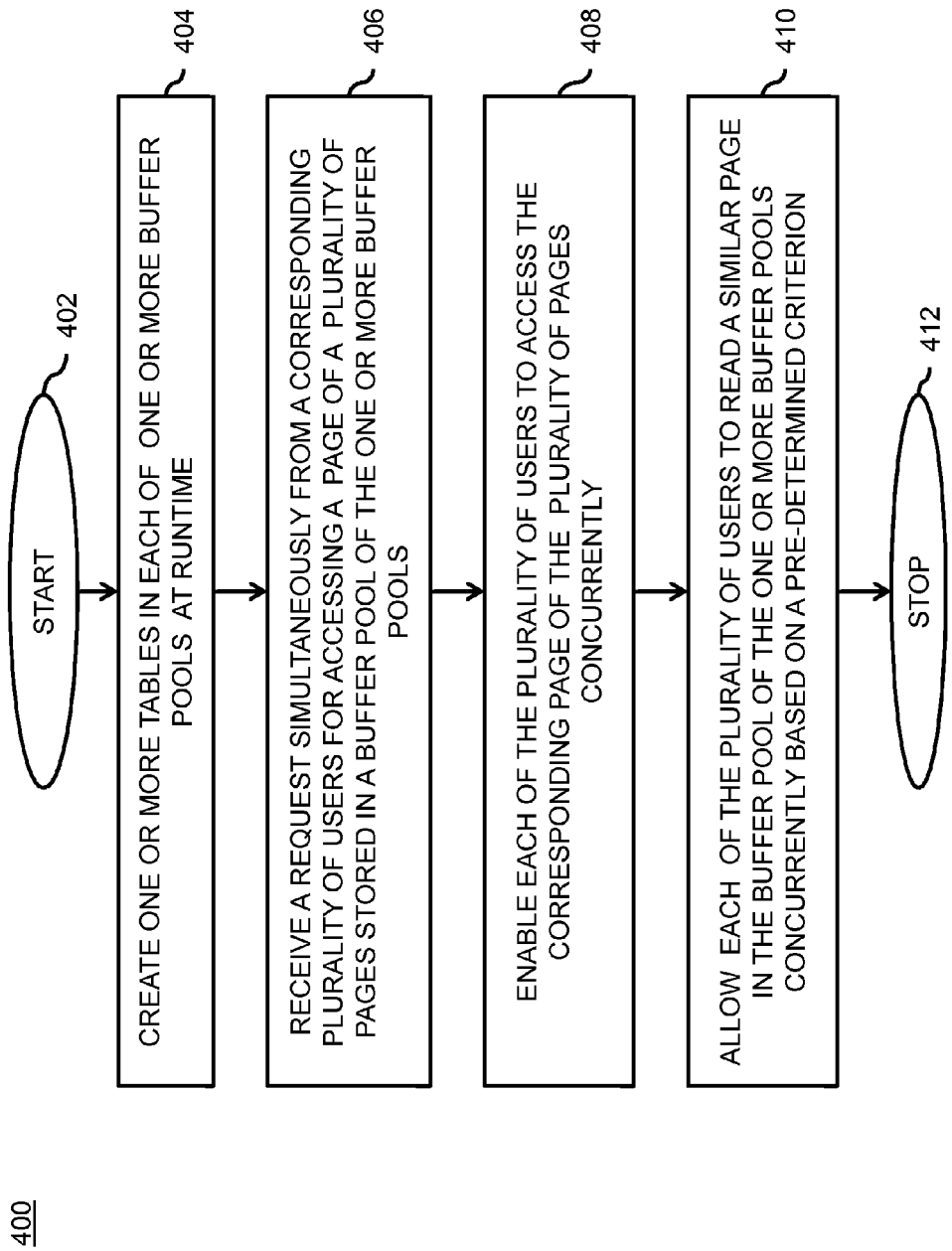
Figure 5:
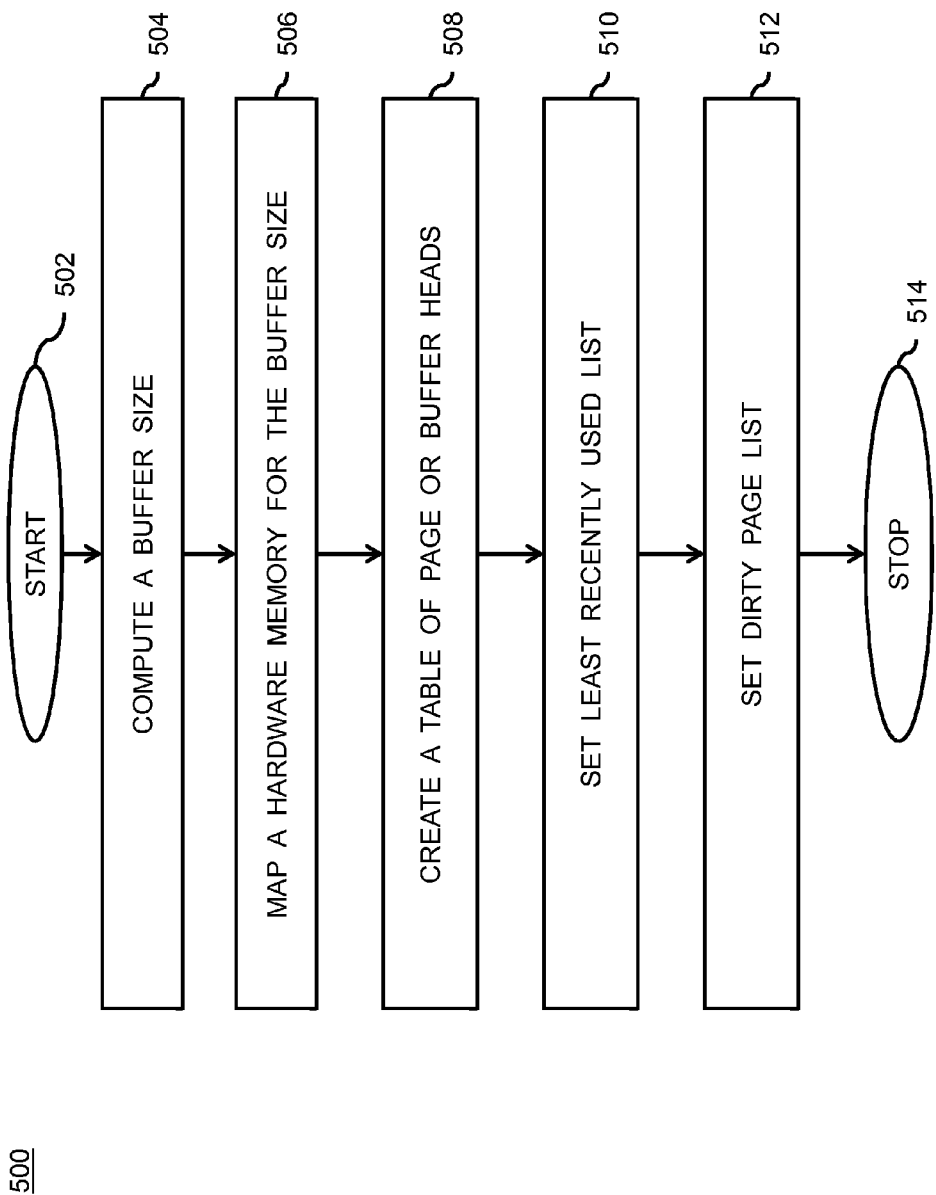
Figure 6:
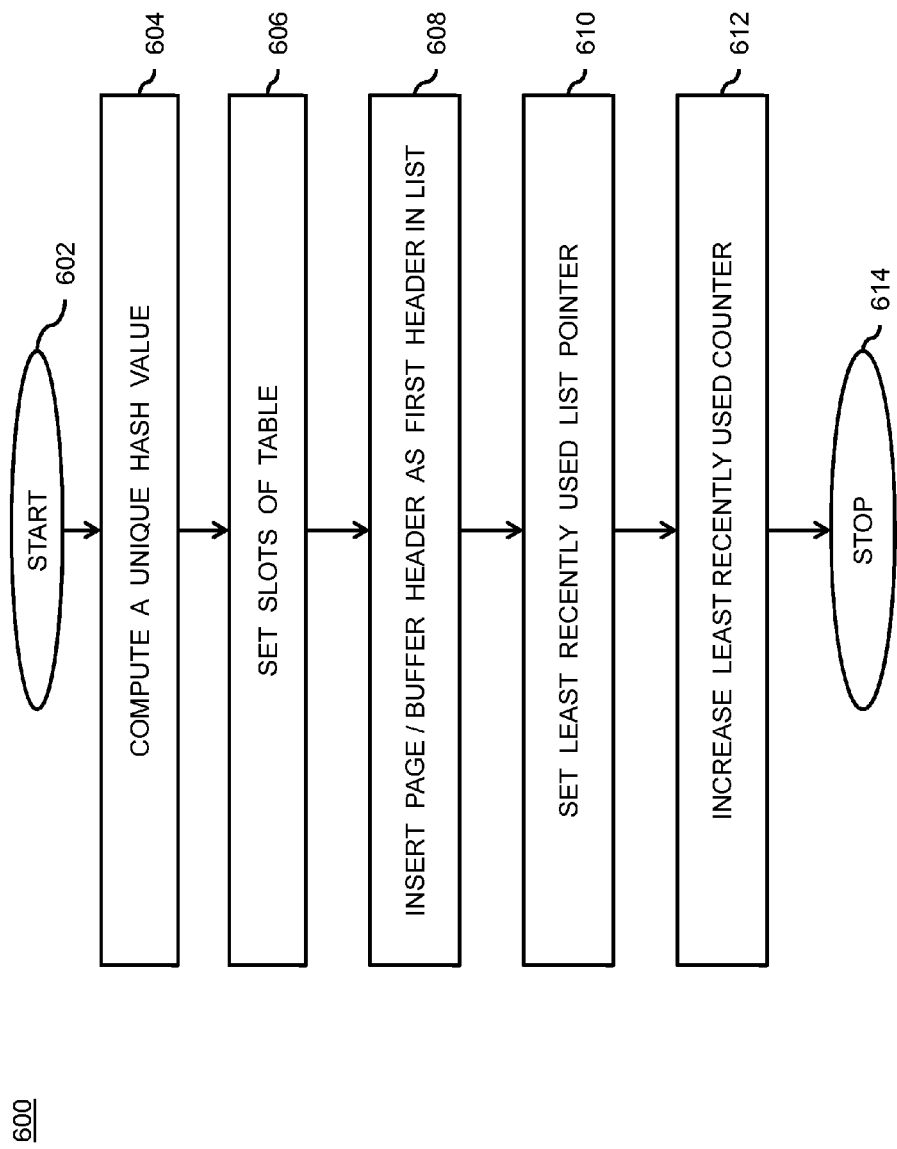
Figure 7:
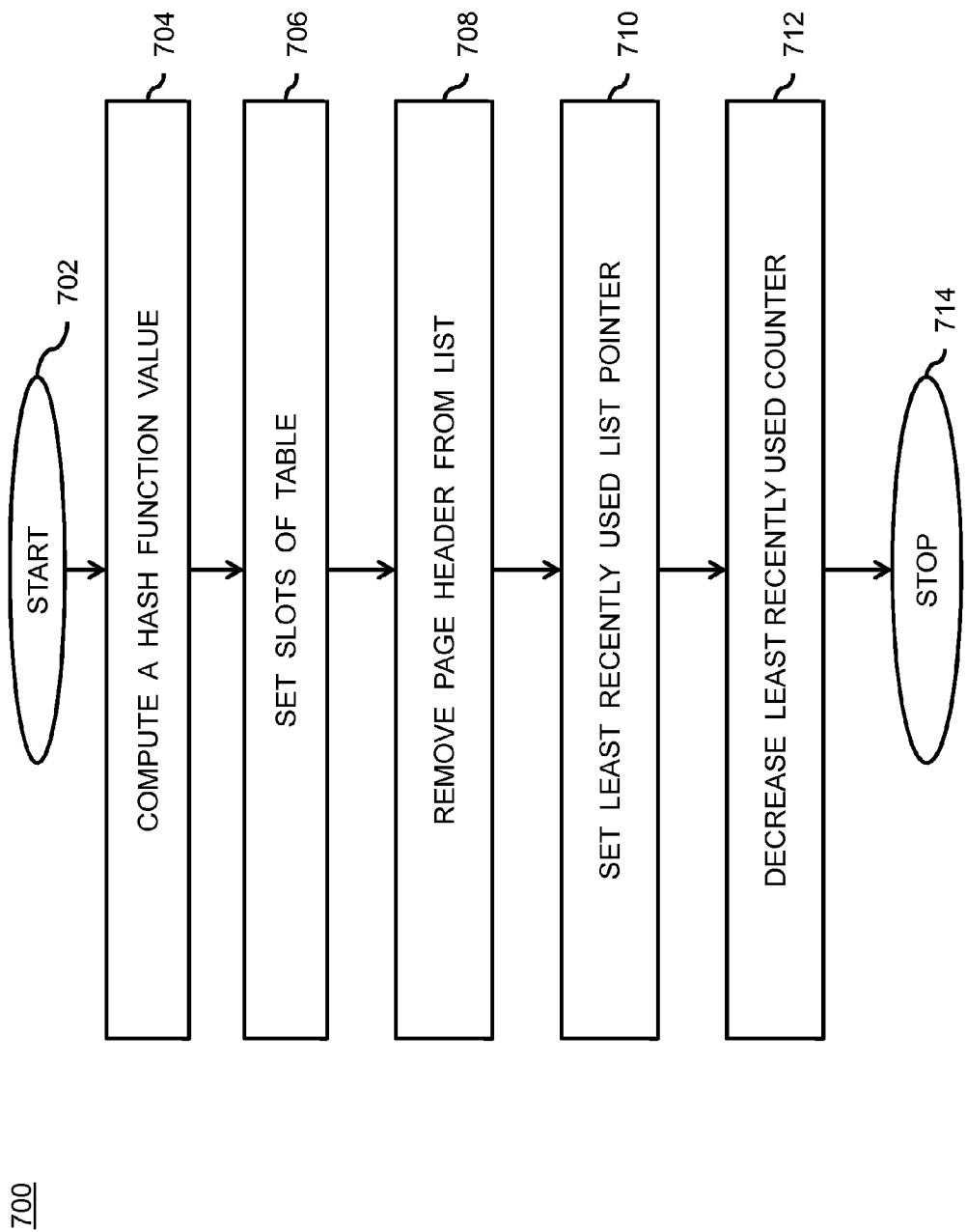
Figure 8:
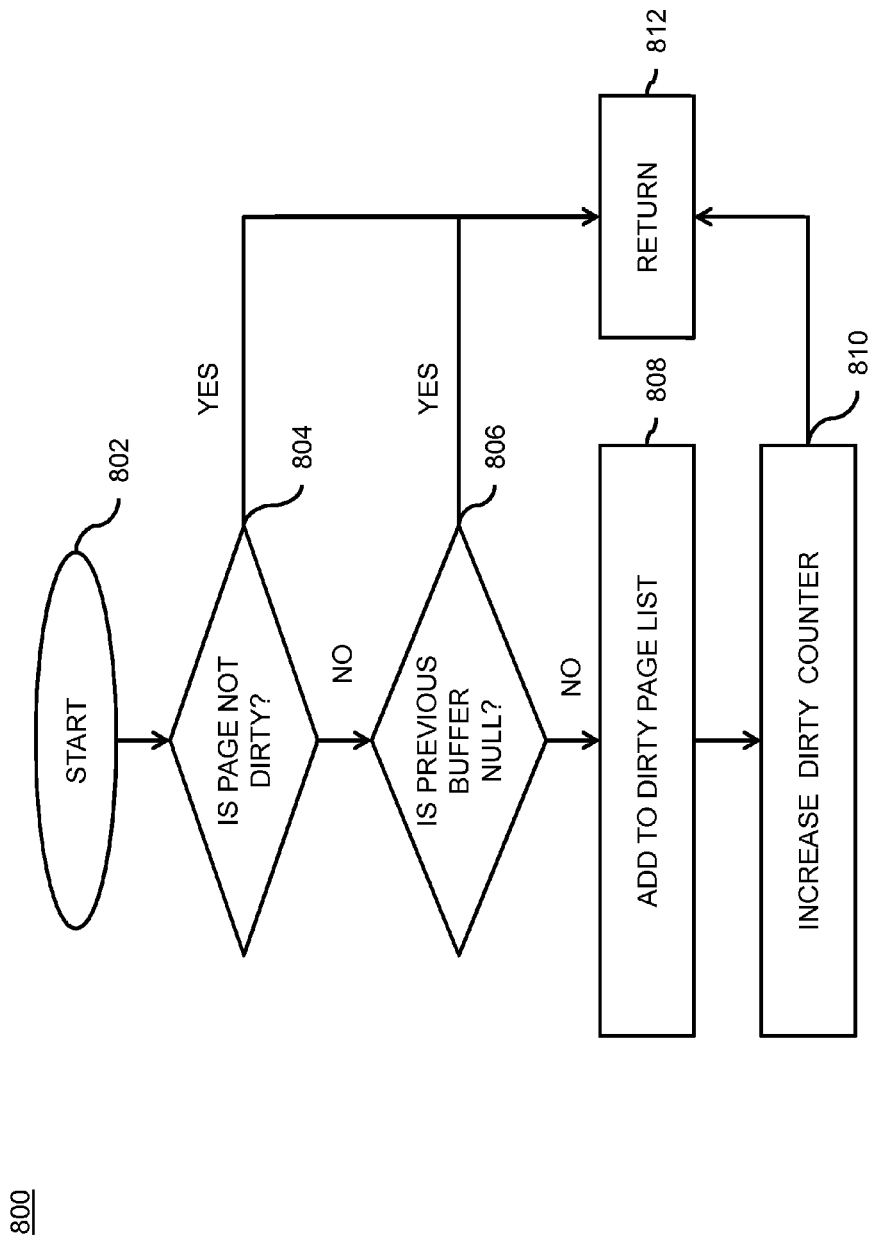
Figure 9:
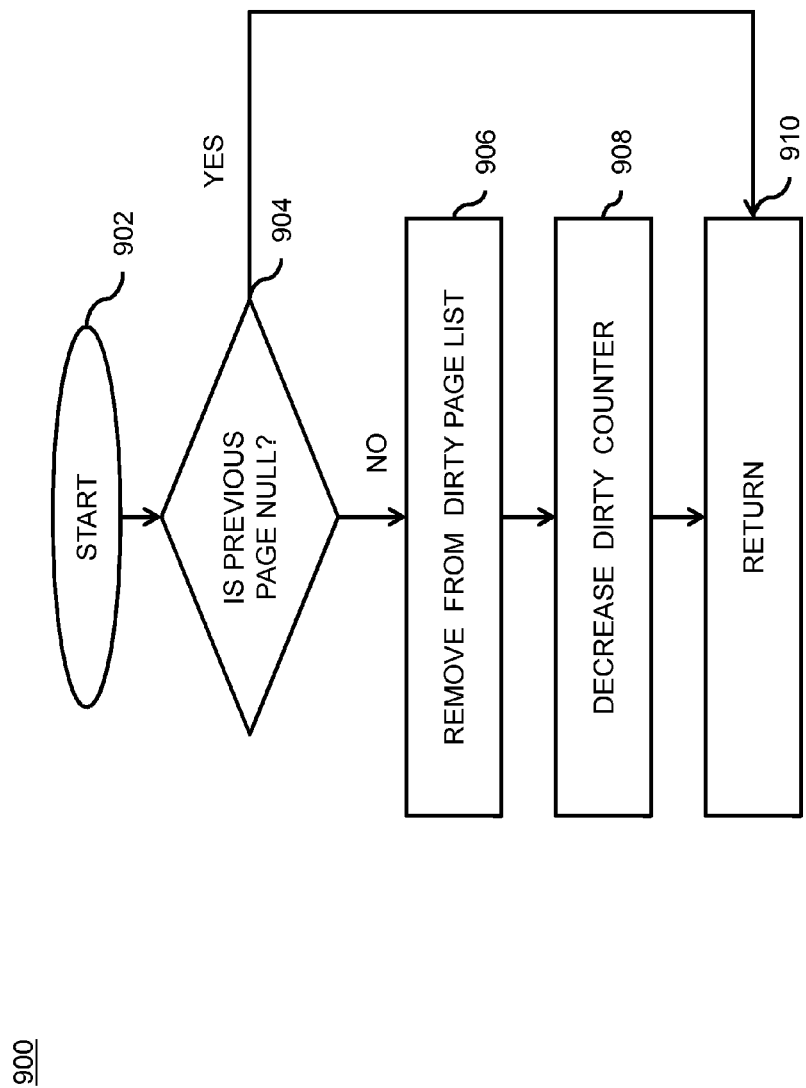
Figure 10:
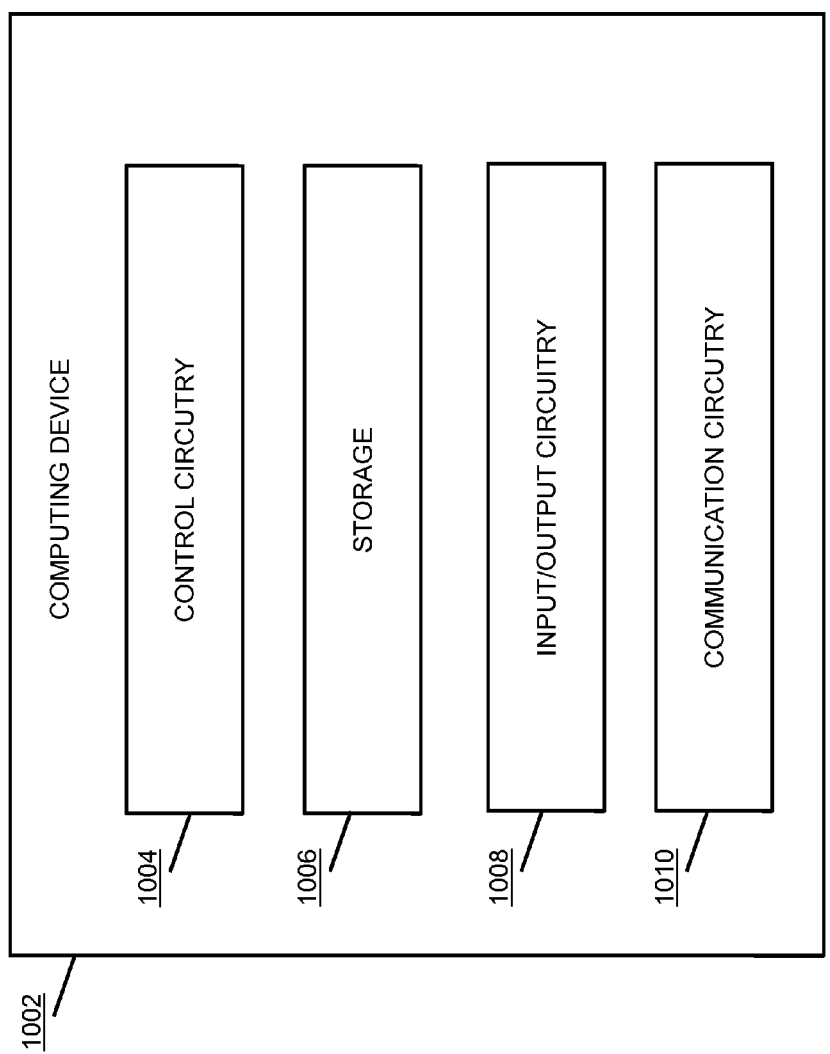

Having thus described the invention in general terms, reference will now be made to the accompanying drawings, which are not necessarily drawn to scale, and wherein:

FIG. 1 illustrates a system for providing a concurrent buffer pool by utilizing a lockless mechanism, in accordance with various embodiments of the present disclosure;

FIG. 2 illustrates an interaction between various module of the buffer pool and a primary storage system, in accordance with various embodiments of the present disclosure;

FIG. 3 illustrates a flowchart for providing the concurrent buffer pool by utilizing the lockless mechanism; in accordance with various embodiments of the present disclosure;

FIG. 4 illustrates another flowchart for providing the concurrent buffer pool by utilizing the lockless mechanism; in accordance with various embodiments of the present disclosure; and FIG. 5 illustrates a flowchart for initializing a page cache table, in accordance with an embodiment of the present disclosure;

FIG. 6 illustrates another flowchart for performing insertion into the page cache table, in accordance with another embodiment of the present disclosure;

FIG. 7 illustrates yet another flowchart for performing a removing operation from the page cache table, in accordance with yet another embodiment of the present disclosure;

FIG. 8 illustrates yet another flowchart for performing insertion in a dirty page list, in accordance with yet another embodiment of the present disclosure;

FIG. 9 illustrates yet another flowchart for performing deletion in the dirty page list, in accordance with yet another embodiment of the present disclosure; and FIG. 10 depicts a block diagram of a computing device for practicing various embodiments of the present disclosure.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates a database management system 100 for providing a concurrent buffer pool in a database, in accordance with various embodiments of the present disclosure. The database management system 100 is configured for providing the highly concurrent buffer pool by utilizing a lockless mechanism. The lockless mechanism enables one or more users to simultaneously access pages in the buffer pool without interfering with each other. The simultaneous access to the pages provides more concurrency.

The database management system 100 includes a query 102, a random access memory 104 and a primary storage system 106. Moreover, the random access memory 104 includes one or more buffer pools 104a. In addition, the primary storage system 106 includes a database 108. The database management system 100 is configured for managing operations of the buffer memory for increasing performance. In addition, the one or more buffer pools 104a are associated with a database management system (DBMS), a database engine, information retrieval systems and the like.

Further, the database management system 100 handles pre-fetching of one or more pages from the database 108 of the primary storage system 106 by performing one or more operations. The one or more pages are pre-fetched synchronously or asynchronously into the one or more buffer pools. The database management system 100 enables a faster access to the one or more pages requested by the corresponding one or more users in real time. The database management system 100 increases a probability of finding a random page of the one or more pages (explained later in the patent application).

In an embodiment of the present disclosure, the user present at a client's end provides one or more inputs. In another embodiment of the present disclosure, the one or more inputs may be any type of input for carrying out one or more processes at both ends of an application. Moreover, the one or more processes may be any process including requesting a page, carrying out a transaction in real time and the like. Further, a plurality of records is maintained in the database 108. In an embodiment of the present disclosure, the plurality of records corresponds to the one or more pages accessed by the user over a period of time. In addition, the one or more pages are updated each time the user sends a request for accessing the one or more pages.

Moreover, the one or more inputs or requests provided by the user are provided to the database management system 100 in form of the query 102. In an embodiment of the present disclosure, the query 102 is generated by a query processing system. Further, the query 102 is generated for carrying out any type of updating in the database 108. In an embodiment of the present disclosure, the query processing system may be any system for transferring of the query 102 from the client's end. In another embodiment of the present disclosure, the query processing system formats the one or more inputs into the query 102 for responding to user requests.

Further, the query 102 may be provided for performing one or more operations on the database 108. In an embodiment of the present disclosure, the query 102 corresponds to a request made by the one or more users to access the one or more pages. In an embodiment of the present disclosure, the one or more operations are performed by executing one or more changes in the database 108. The one or more operations include update, delete, write and the like. Going further, the query processing system is connected to the random access memory 104. In an embodiment of the present disclosure, the query processing system is connected to the random access memory 104 through a bus. Moreover, the random access memory 104 is configured for storing the one or more pages randomly in memory. The random access memory 104 enables accessing data in a random way. In an embodiment of the present disclosure, the random access memory 104 enables a faster access to a specific set of data stored.

In an embodiment of the present disclosure, the random access memory 104 may have any amount of memory for performing one or more operations and storing the one or more pages in the memory. The random access memory 104 may be of 1 GB, 2 GB, 4 GB, 8 GB and the like. The one or more pages are temporarily stored in the random access memory 104. The random access memory 104 is a volatile memory which stores the one or more pages up to a point till a system is in power on state.

Moreover, the random access memory 104 includes one or more buffer pools 104a. In addition, a portion of the random access memory is occupied by the one or more buffer pools 104a. In an embodiment of the present disclosure, the random access memory 104 includes a buffer cache. The buffer cache includes the one or more buffer pools 104a. In an embodiment of the present disclosure, the query 102 generated from the query processing system are transferred to the one or more buffer pools 104a. The one or more buffer pools 104a perform one or more operations based on the query 102 received from the query processing system. Moreover, the one or more operations are performed for increasing the concurrency and efficiency of the one or more buffer pools 104a (as described below in the detailed description of FIG. 2).

Moreover, the random access memory 104 is connected to the primary storage system 106. In an embodiment of the present disclosure, the random access memory 104 is connected to the primary storage system 106 through a bus. Further, the primary storage system 106 includes the database 108 for storing one or more information associated with one or more processes. In an embodiment of the present disclosure, the primary storage system is a hard disk. In another embodiment of the present disclosure, the primary storage system 106 is a solid state drive (SSD). In an embodiment of the present disclosure, the primary storage system 106 stores the one or more pages permanently. Moreover, the one or more pages are stored after updation in the one or more buffer pools 104a.

Further, the primary storage system 106 stores the one or more pages in the one or more buffer pools 104a and requests the one or more buffer pools 104a for the one or more pages stored for faster application performance. In an embodiment of the present disclosure, the one or more pages are retrieved from the one or more buffer pools 104a when the user sends a request for access to any information or data which has been accessed earlier. In an embodiment of the present disclosure, the primary storage system 104 transfers the data in form of the one or more pages to the one or more buffer pools 104a. The primary storage system 106 transfers the data at a regular basis. The data is sent from the database 108 to the one or more buffer pools 104a. The primary storage system 106 may have any amount of memory depending on a user requirement.

Further, the one or more buffer pools 104a may be of any size. The size of the one or more buffer pools 104a includes but may not be limited to 32 MB, 64 MB, 128 MB, 256 MB. The database management system 100 allocates memory for the one or more buffer pools 104a in a dynamic way. Going further, the one or more buffer pools 104a is a place or location in a system memory or disk. Moreover, the one or more buffer pools 104a are utilized for caching of table and index pages. The one or more buffer pools 104a caches the tables and indexes the data pages after reading from the database 108.

In an embodiment of the present disclosure, the one or more buffer pools 104a are configured for improving a response time for retrieval of data stored in the one or more buffer pools 104a. Moreover, the data is stored in form of tables in the one or more buffer pools 104a. The database 108 writes the one or more pages into the one or more buffer pools 104a. In an embodiment of the present disclosure, the one or more pages are written for allowing faster access to the one or more pages when requested by a database server. In an embodiment of the present disclosure, the one or more pages are clean pages. Moreover, the size of the one or more buffer pools 104a is kept high in order to provide a good performance of the database 108.

Going further, each of the one or more buffer pools 104a contains a page cache for caching one or more pages of files. The database management system 100 includes unified buffer pools and page caches. In an embodiment of the present disclosure, I/O is performed in the page cache. The cached data can be represented as a file as well as a block. In an embodiment of the present disclosure, the one or more buffer pools 104a store a single instance of a data.

Moreover, the database 108 is configured for reading and writing data stored in the one or more pages from the one or more buffer pools 104a. In an embodiment of the present disclosure, the one or more buffer pools 104a are maintained based on least recently used basis. In another embodiment of the present disclosure, the one or more buffer pools 104a perform eviction of pages of the one or more pages stored based on the least recently used basis. In addition, the one or more buffer pools 104a enable control over deciding a budget over the memory to be utilized for performing the one or more operations. Further, each of the one or more buffer pools 104a maintains a data structure and one or more background workers.

It may be noted that in FIG. 1, the query processing system is associated with the random access memory 104; however those skilled in the art would appreciate that the query processing system 102 is associated more number of random access memories. It may also be noted that in FIG. 1, the random access memory 104 is associated with the primary storage system 106; however those skilled in the art would appreciate that there are more random access memories associated with more primary storage systems.

FIG. 2 illustrates an interaction between various modules of the one or more buffer pools 104a and the primary storage system 106, in accordance with various embodiments of the present disclosure. It may be noted that to explain the system elements of FIG. 2, references will be made to the system elements of FIG. 1. In an embodiment of the present disclosure, the various modules of the one or more buffer pools 104a provide the high concurrency and enable the one or more users to simultaneously access the pages in the one or more buffer pools 104a. The various modules of the one or more buffer pools 104a includes one or more tables 202, a LRU (least recently used) list 204, a dirty page list 206 and a free list 208. In an embodiment of the present disclosure, the concurrency of the one or more buffer pools 104a is handled by a buffer management system. In an embodiment of the present disclosure, the various modules or parts of the one or more buffer pools 104a are handled by the buffer management system.

Going further, each of the one or more buffer pools 104a maintain the one or more tables 202 for storing one or more information associated with the one or more pages stored in the one or more buffer pools 104a. In an embodiment of the present disclosure, each of the one or more tables 104a is a hash table for gaining faster access to the data. The hash table is a data structure which associates key with values. In an embodiment of the present disclosure, the hash table is configured for finding a particular value in the hash table based on a particular key. In an embodiment of the present disclosure, the hash table works based on a hash function. In addition, the hash function transforms the key into an index in an array for locating a particular location. In an embodiment of the present disclosure, the hash table is configured to provide the access to the one or more pages to the one or more users.

In an embodiment of the present disclosure, the hash table contains a plurality of hash chains that are linked with each of the one or more buffer pools 104a. Further, the plurality of hash chains are utilized for determining whether a particular page is stored in a buffer pool of the one or more buffer pools 104a. Furthermore, the buffer management system is configured for creating the one or more tables 202 in each of the one or more buffer pools 104a at runtime. In an embodiment of the present disclosure, the one or more tables 202 are created dynamically when the database 108 is online. In an embodiment of the present disclosure, size of the one or more tables 202 is a multiple of size of the one or more pages.

Further, the one or more tables 202 are created for storing the one or more pages in a table space in the buffer pool of the one or more buffer pools 104a. In an embodiment of the present disclosure, the one or more tables 202 store the one or more pages by performing the pre-fetching process. In another embodiment of the present disclosure, the pre-fetching of the one or more pages is done synchronously or asynchronously. In an embodiment of the present disclosure, the one or more pages are pre-stored in the one or more tables 202 before any request received from the one or more users for accessing the one or more pages. In another embodiment of the present disclosure, the one or more pages are pre-fetched when the one or more users request for accessing the one or more pages from the one or more buffer pools 104a. In an embodiment of the present disclosure, each of the plurality of pages is accessed through one or more lists in the buffer pool. The one or more lists include the least recently used list 204, the dirty page list 206 and the free list 208. Each of the one or more lists is accessed by the plurality of users concurrently (as explained below in the patent application).

In an embodiment of the present disclosure, the one or more buffer pools 104a perform the pre-fetching of the one or more pages based on a pre-determined criterion. In addition, the pre-determined criterion includes anticipating a need for the one or more pages which would be required in future for reading and writing. Moreover, the pre-fetching of the one or more pages is done for allowing faster access to the one or more pages. In an embodiment of the present disclosure, the one or more buffer pools 104a predicts a set of pages which would be required for use and fetches the set of pages from the database 108 at any time. In an embodiment of the present disclosure, the pre-fetching of the one or more pages is done based on an adaptive algorithm.

Going further, each of the one or more tables 202 is a lockless table. In an embodiment of the present disclosure, the lockless property of the one or more tables 202 enables the simultaneous access to the one or more users. In an embodiment of the present disclosure, the lockless property allows the one or more pages to be accessed at the same time by a plurality of users. Moreover, each of the one or more tables 202 includes a plurality of lockless slots. In an embodiment of the present disclosure, the plurality of lockless slots is logical slots. In an embodiment of the present disclosure, the memory allotted to the one or more tables 202 is slotted into the plurality of lockless slots. In another embodiment of the present disclosure, slotting of the memory into the plurality of lockless slots is done based on the size of the one or more pages in a sequential manner. In an embodiment of the present disclosure, each of the plurality of lockless slots is associated with a logical slot number.

Moreover, the plurality of lockless slots is associated with a plurality of headers in the one or more tables 202. In an embodiment of the present disclosure, the plurality of lockless slots is linked with a plurality of headers in the one or more tables 202. In addition, each of the plurality of headers contains one or more information associated with the one or more pages stored in the one or more buffer pools 104a. The one or more information corresponds to metadata information associated with the one or more pages. Further, the metadata information includes but may not be limited to a location of the one or more pages in the buffer pool of the one or more buffer pools 104a, an offset of a file system for data page or index page and a block number.

In an embodiment of the present disclosure, the plurality of headers is small and has a size of about 32 bytes. In an embodiment of the present disclosure, the plurality of headers is linked in the one or more tables 202, the least recently used list 204, the dirty page list 206 and the free list 208. Moreover, the plurality of headers manages the one or more pages in the one or more buffer pools 104a. In an embodiment of the present disclosure, the plurality of headers is linked with each other through a linked list mechanism. In an embodiment of the present disclosure, the access to the one or more pages is possible through the one or more tables 202. The one or more tables 202 are utilized for searching or accessing the particular page by accessing a particular slot containing a header having information about the particular page.

Going further, each of the one or more buffer pools 104a maintains the least recently used (LRU) list 204 and the dirty page list 206. In an embodiment of the present disclosure, the least recently used list 204 and the dirty page list 206 for implementing temporal locality and enabling flushing of right set of pages at any given time. Moreover, each of the one or more buffer pools 104a is managed on a least recently used (LRU) basis for storing a data block in a most recently used buffer available for subsequent access by an application. The least recently used mechanism helps in flushing the pages which have been used least recently. In an embodiment of the present disclosure, the access to the one or more pages is provided by accessing the least recently used list 204 and the dirty page list 206.

In an embodiment of the present disclosure, the least recently used list 204 performs the flushing of pages based on a replacement algorithm. Moreover, the pages are flushed based on a least recently used mechanism. The least recently used mechanism helps in flushing the pages when new pages are to be stored in the one or more buffer pools 104a and the page which is least recently used is flushed out. In an embodiment of the present disclosure, the flushing of the pages is done on a consistent basis and allows a continuous access to the one or more pages.

In another embodiment of the present disclosure, the pages are flushed when the one or more buffer pools 104a are full and require free space for storing more pages from the database 108. In an embodiment of the present disclosure, the dirty page list 206 in each of the one or more buffer pools 104a store pages which are updated with data but are not written onto the database 108 in a disk. In an embodiment of the present disclosure, the one or more buffer pools 104a request for new data after updated data pages are written to the database 108. Moreover, the pages are written to the dirty page list 206 whenever a write operation is performed on the pages. In an embodiment of the present disclosure, the written pages are flushed from the dirty page list 206 to the database 108. Further, the access to the least recently used list 204 and the dirty page list 206 is concurrent.

Going further, each of the one or more buffer pools 104a contains the free page list 208 for utilizing based on a requirement. In an embodiment of the present disclosure, the free list 208 contains information associated with a number of pages that are free. In another embodiment of the present disclosure, the free list 208 is a list of pages that are available for allocation to applications. In addition, the free list 208 may be implemented as a linked list that connects unallocated pages of the memory together by using a first word of each unallocated region as a pointer to the next unallocated region. In an embodiment of the present disclosure, successive locations in the free list 208 do not necessarily identify consecutive memory pages. In another embodiment of the present disclosure, the free list 208 cannot be used to provide multiple consecutive memory pages when an application uses more than one page.

Moreover, one or more background workers are configured for checking health of each of the one or more buffer pools 104a on a frequent basis. In addition, the background workers are configured to check whether the pages are flushed or reclaimed accordingly. In an embodiment of the present disclosure, the one or more buffer pools 104a implement a quasi adaptive algorithm for the flushing of the pages. In another embodiment of the present disclosure, the quasi adaptive algorithm ensures that the database 108 is not in a pause state for a long time during shortage of free pages in the one or more buffer pools 104a.

In an embodiment of the present disclosure, the background workers perform the reading and the writing of the data for avoiding separate page writes. Going further, the one or more buffer pools 104a handle the one or more pages requested by an operating system database. In an embodiment of the present disclosure, each of the one or more buffer pools 104a caches the one or more pages in 8 Kb blocks. The one or more pages contain a recently accessed data by the user and a predicted data that would be required in future by the user.

Going further, the buffer management system is configured for receiving a request for accessing a page of a plurality of pages stored in the buffer pool of the one or more buffer pools 104a simultaneously from the corresponding plurality of users. In a embodiment of the present disclosure, each user of the plurality of users sends the request for accessing a different page at the same time. In addition, the request is received in form of the query 102. In an embodiment of the present disclosure, the query processing system generates the query 102 based on the request received. In an embodiment of the present disclosure, the request corresponds to any type of operation to be performed on the corresponding page of the plurality of pages. Moreover, the plurality of pages is requested from a corresponding slot of the plurality of slots in a corresponding table of the one or more tables 202 in the buffer pool.

Moreover, the buffer management system is configured for enabling each of the plurality of users to access the corresponding page of the plurality of pages concurrently. In an embodiment of the present disclosure, the buffer management system allows each of the plurality of users to access the corresponding page of the plurality of pages at the same time. In addition, the concurrent access to the plurality of pages is provided by locking each of a plurality of buffer headers. Further, each buffer header of the plurality of buffer headers corresponds to the page of the plurality of pages requested by the corresponding user of the plurality of users.

In an embodiment of the present disclosure, each of the plurality of headers is associated with the corresponding slot of the plurality of slots. The plurality of slots is lockless which allows every user to access the corresponding header of the plurality of header buffers. In an embodiment of the present disclosure, each header buffer of the plurality of header buffers contains information about the corresponding page request by the corresponding user of the plurality of users. In addition, each buffer header is individually locked for allowing each of the plurality of users to access the corresponding page of the plurality of pages concurrently.

In an embodiment of the present disclosure, each buffer header contains information about the corresponding page of the plurality of pages. In an embodiment of the present disclosure, each buffer header is dedicated to the particular page of the plurality of pages. In another embodiment of the present disclosure, each buffer header is dedicated to provide access to the corresponding user of the plurality of users. Initially, the buffer management system determines the corresponding slot of the plurality of lockless slot containing information about the plurality of pages requested by the one or more users. In an embodiment of the present disclosure, the determining is done by utilizing the one or more tables 202.

In addition, the query 102 received by the buffer management aids in searching the particular page of the plurality of pages by generating a particular key for the query 102. In an embodiment of the present disclosure, the hashing function of the one or more tables 202 takes the key as an input and searched for the particular slot and the particular header buffer corresponding to the particular page of the plurality of pages. In addition, the particular header buffer is accessed for each corresponding request for accessing information of the particular page of the plurality of pages. Moreover, each header buffer is locked for allowing each user to simultaneously access the corresponding page of the plurality of pages. In an embodiment of the present disclosure, the locking is done only at header level and not at table level, slot level and list level. In an embodiment of the present disclosure, only headers containing information about the plurality of pages requested by the corresponding plurality of users are locked for allowing concurrent access.

Further, the information about the page of the plurality of pages is accessed through the corresponding header buffer of the plurality of header buffers. Each of the plurality of buffer headers provides information about the corresponding plurality of pages. Furthermore, the information is utilized for accessing the plurality of pages in the least recently used list 204 and the dirty page list 206. In an embodiment of the present disclosure, the accessing is done concurrently. In addition, the plurality of pages are read from the least recently used list 204 and the dirty page list 206 and provided to the corresponding plurality of users. Moreover, each of the plurality of pages are read concurrently and provided to the corresponding plurality of users concurrently. In an embodiment of the present disclosure, the access to the least recently used list 204 and the dirty page list 206 is made concurrent.

In an embodiment of the present disclosure, the buffer management system is configured for allowing each of the plurality of users to read a similar page in the buffer pool concurrently. In another embodiment of the present disclosure, the concurrent access to the similar page is provided based on a pre-determined criterion. In yet another embodiment of the present disclosure, the pre-determined criterion includes identifying whether the similar page is accessed for reading or writing.

In an embodiment of the present disclosure, the buffer management system is further configured for computing a size of the buffer pool. In another embodiment of the present disclosure, the size is computed for the creation of the one or more tables 202 in the buffer pool.

In an embodiment of the present disclosure, the buffer management system further includes adding the plurality of pages in the dirty page list 206. In another embodiment of the present disclosure, the plurality of pages is added based on when each of the plurality of pages are dirty. In yet another embodiment of the present disclosure, the plurality of pages is added based on when a pervious buffer is not null.

FIG. 3 illustrates a flowchart 300 for providing the concurrent buffer pool by utilizing the lockless mechanism; in accordance with various embodiments of the present disclosure. It may be noted that to explain the process steps of flowchart 300, references will be made to the system elements of FIG. 1 and FIG. 2. It may also be noted that the flowchart 300 may have lesser or more number of steps for providing the concurrent buffer pool by utilizing the lockless mechanism.

The flowchart 300 initiates at step 302. Following step 302, at step 304, the buffer management system creates the one or more tables 202 in each of the one or more buffer pools 104*a* at the runtime. Further, at step 306, the database 108 receives the request for accessing the page of the plurality of pages stored in the buffer pool of the one or more buffer pools 104*a* simultaneously from the corresponding plurality of users. The request is received in form of the query 102. Moreover, the plurality of pages is requested from the corresponding slot of the plurality of slots in the corresponding table of the one or more tables in the buffer pool. At step 308, the buffer management system enables each of the plurality of users to access the corresponding page of the plurality of pages concurrently. The concurrent access is provided by locking each of the plurality of buffer headers. Each buffer header of the plurality of buffer headers corresponds to the page of the plurality of pages requested by the corresponding user of the plurality of users. In addition, each buffer header is individually locked for allowing each of the plurality of users to access the corresponding page of the plurality of pages concurrently. The flowchart 300 terminates at step 310.

FIG. 4 illustrates another flowchart 400 for providing the concurrent buffer pool by utilizing the lockless mechanism; in accordance with various embodiments of the present disclosure. It may be noted that to explain the process steps of flowchart 400, references will be made to the system elements of FIG. 1 and FIG. 2. It may also be noted that the flowchart 400 may have lesser or more number of steps for providing the concurrent buffer pool by utilizing the lockless mechanism.

The flowchart 400 initiates at step 402. Following step 402, at step 404, the buffer management system creates the one or more tables 402 in each of the one or more buffer pools 104*a* at the runtime. Further, at step 406, the database 108 receives the request for accessing the page of the plurality of pages stored in the buffer pool of the one or more buffer pools 104*a* simultaneously from the corresponding plurality of users. The request is received in form of the query 102. Moreover, the plurality of pages is requested from the corresponding slot of the plurality of slots in the corresponding table of the one or more tables in the buffer pool. At step 408, the buffer management system enables each of the plurality of users to access the corresponding page of the plurality of pages concurrently. The concurrent access is provided by locking each of the plurality of buffer headers. Each buffer header of the plurality of buffer headers corresponds to the page of the plurality of pages requested by the corresponding user of the plurality of users. In addition, each buffer header is individually locked for allowing each of the plurality of users to access the corresponding page of the plurality of pages concurrently. At step 410, the buffer management system allows each of the plurality of users to read the similar page in the buffer pool of the one or more buffer pools 104*a* based on the pre-determined criterion. In addition, the pre-determined criterion includes identifying whether the similar page is accessed for the reading or the writing. The flowchart 400 terminates at step 412.

FIG. 5 illustrates a flowchart 500 for initializing a page cache table, in accordance with an embodiment of the present disclosure. It may be noted that to explain the process steps of flowchart 500, references will be made to the system elements of FIG. 1 and FIG. 2. It may also be noted that the flowchart 500 may have lesser or more number of steps for initializing the page cache table.

The flowchart 500 initiates at step 502. Following step 502, at step 504, the size of the buffer is computed. At step 506, a hardware memory is mapped for the size of the buffer. At step 508, a table of the one or more pages or buffer heads is created. At step 510, the least recently used list 204 is set. At step 512, the dirty page list 206 is set. The flowchart 500 terminates at step 514.

FIG. 6 illustrates another flowchart 600 for performing insertion into the page cache table, in accordance with another embodiment of the present disclosure. It may be noted that to explain the process steps of flowchart 600, references will be made to the system elements of FIG. 1 and FIG. 2. It may also be noted that the flowchart 600 may have lesser or more number of steps for performing insertion into the page cache table.

The flowchart 600 initiates at step 602. Following step 602, at step 604, a unique hash value is computed. At step 606, the slots of the table created are set. At step 608, the page/buffer header is inserted as a first header in the list. At step 610, a least recently used pointer is set. At step 612, a least recently used counter is increased. The flowchart 600 terminates at step 614.

FIG. 7 illustrates another flowchart 700 for performing a removing operation from the page cache table, in accordance with yet another embodiment of the present disclosure. It may be noted that to explain the process steps of flowchart 700, references will be made to the system elements of FIG. 1 and FIG. 2. It may also be noted that the flowchart 700 may have lesser or more number of steps for performing the removing operation from the page cache table.

The flowchart 700 initiates at step 702. Following step 702, at step 704, the hash function value is computed. At step 706, the slots of the table created are set. At step 708, the page/buffer header is removed from the list. At step 710, the least recently used pointer is set. At step 712, the least recently used counter is decreased. The flowchart 700 terminates at step 714.

FIG. 8 illustrates another flowchart 800 for performing insertion in the dirty page list 206, in accordance with yet another embodiment of the present disclosure. It may be noted that to explain the process steps of flowchart 800, references will be made to the system elements of FIG. 1 and FIG. 2. It may also be noted that the flowchart 800 may have lesser or more number of steps for performing the insertion in the dirty page list 206.

The flowchart 800 initiates at step 802. Following step 802, at step 804, a condition is checked whether the page is dirty. If the page is dirty, the process returns to step 812. If the page is not dirty, the process continues to step 806. At step 806, a condition is checked whether the previous buffer is null or not. If the previous buffer is null, the process returns to step 812. If the previous buffer is not null, the process continues to step 808. Further, at step 808, the page is added to the dirty page list 206. Following step 808, at step 810, a dirty counter is increased. Following step 810, the process returns to step 812.

FIG. 9 illustrates another flowchart 900 for performing deletion in the dirty page list 206, in accordance with yet another embodiment of the present disclosure. It may be noted that to explain the process steps of flowchart 900, references will be made to the system elements of FIG. 1 and FIG. 2. It may also be noted that the flowchart 900 may have lesser or more number of steps for performing the deletion in the dirty page list 206.

The flowchart 900 initiates at step 902. Following step 902, at step 904, a condition is checked whether the previous buffer is null or not. If the previous buffer is null, the process returns to step 910. If the previous buffer is not null, the process continues to step 906. Further, at step 906, the page is removed from the dirty page list 206. Following step 906, at step 908, the dirty counter is decreased. Following step 908, the process returns to step 910.

The present method and system provided in the disclosure has many advantages over the prior art. The present method and system improves the efficiency of the overall I/O which in turn increases the performance of the system. The present method and system helps in differentiating between whether the user wants to read or write on the particular page. The present system and method provides concurrent access to the buffer pool and allows multiple users to simultaneously access pages from the buffer pool in a faster way. The concurrent access to the buffer pool increases performance of user applications by decreasing a response time of the database during a request made by a user for accessing any data. The concurrent access removes the need for the buffer memory to be free until a current user has finished accessing the page. In addition, the seek time and the latency time of the buffer pool during the request for data reading by the user is decreased. Moreover, the overall throughput and efficiency of the application is increased. The present disclosure allows users to build high performance application for huge data or Big data handing. In addition, the high throughput results in lesser utilization of amount of resources. Further, the present disclosure provides a high database performance. Furthermore, the high performing database enables business to sustain higher number of clients/users and maintain SLA during a high load scenario resulting in uninterrupted business resulting in saving loss of business and money.

FIG. 10 depicts a block diagram of a computing device 1002 for practicing various embodiments of the present disclosure. The computing device 1002 includes a control circuitry 1004, storage 1006, an input/output ("I/O") circuitry 1008 and a communications circuitry 1010.

Those skilled in the art would appreciate that the computing device 1002 of FIG. 10 may include one or more components which may not be shown here. The computing device 1002 includes any suitable type of electronic device. Examples of the computing device 1002 include but may not be limited to a digital media player (e.g., an iPod™ made available by Apple Inc. of Cupertino, Calif.), a personal e-mail device (e.g., a Blackberry™ made available by Research in Motion of Waterloo, Ontario), a personal data assistant ("PDA"), a cellular telephone, a Smartphone, a handheld gaming device, a digital camera, a laptop computer, and a tablet computer. In another embodiment of the present invention, the computing device 1002 can be a desktop computer.

From the perspective of this invention, the control circuitry 1004 includes any processing circuitry or processor operative to control the operations and performance of the computing device 1002. For example, the control circuitry 1002 may be used to run operating system applications, firmware applications, media playback applications, media editing applications, or any other application. In an embodiment, the control circuitry 1004 drives a display and process inputs received from a user interface.

From the perspective of this invention, the storage 1006 includes one or more storage mediums including a hard-drive, solid state drive, flash memory, permanent memory such as ROM, any other suitable type of storage component, or any combination thereof. The Storage 1006 may store, for example, media data (e.g., music and video files), application data (e.g., for implementing functions on the computing device 1002).

From the perspective of this invention, the I/O circuitry 1008 may be operative to convert (and encode/decode, if necessary) analog signals and other signals into digital data. In an embodiment, the I/O circuitry 1008 may also convert digital data into any other type of signal, and vice-versa. For example, the I/O circuitry 1008 may receive and convert physical contact inputs (e.g., from a multi-touch screen), physical movements (e.g., from a mouse or sensor), analog audio signals (e.g., from a microphone), or any other input. The digital data may be provided to and received from the control circuitry 1004, the storage 1006, or any other component of the computing device 1002.

It may be noted that the I/O circuitry 1008 is illustrated in FIG. 10 as a single component of the computing device 1002; however those skilled in the art would appreciate that several instances of the I/O circuitry 1008 may be included in the computing device 1002.

The computing device 1002 may include any suitable interface or component for allowing a user to provide inputs to the I/O circuitry 1008. The computing device 1002 may include any suitable input mechanism. Examples of the input mechanism include but may not be limited to a button, keypad, dial, a click wheel, and a touch screen. In an embodiment, the computing device 1002 may include a capacitive sensing mechanism, or a multi-touch capacitive sensing mechanism.

In an embodiment, the computing device 1002 may include specialized output circuitry associated with output devices such as, for example, one or more audio outputs. The audio output may include one or more speakers built into the computing device 1002, or an audio component that may be remotely coupled to the computing device 1002.

The one or more speakers can be mono speakers, stereo speakers, or a combination of both. The audio component can be a headset, headphones or ear buds that may be coupled to communications device with a wire or wirelessly.

In an embodiment, the I/O circuitry 1008 may include display circuitry for providing a display visible to the user. For example, the display circuitry may include a screen (e.g., an LCD screen) that is incorporated in the computing device 1002.

The display circuitry may include a movable display or a projecting system for providing a display of content on a surface remote from the computing device 1002 (e.g., a video projector). In an embodiment, the display circuitry may include a coder/decoder to convert digital media data into analog signals. For example, the display circuitry may include video Codecs, audio Codecs, or any other suitable type of Codec.

The display circuitry may include display driver circuitry, circuitry for driving display drivers, or both. The display circuitry may be operative to display content. The display content can include media playback information, application screens for applications implemented on the electronic device, information regarding ongoing communications operations, information regarding incoming communications requests, or device operation screens under the direction of the control circuitry 1004. Alternatively, the display circuitry may be operative to provide instructions to a remote display.

From the prospective of this invention, a communications circuitry 1010 may include any suitable communications circuitry operative to connect to a communications network and to transmit communications (e.g., voice or data) from the computing device 1002 to other devices within the communications network. The communications circuitry 1010 may be operative to interface with the communications network using any suitable communications protocol. Examples of the communications protocol include but may not be limited to Wi-Fi, Bluetooth®, radio frequency systems, infrared, LTE, GSM, GSM plus EDGE, CDMA, and quadband.

In an embodiment, the communications circuitry 1010 may be operative to create a communications network using any suitable communications protocol. For example, the communications circuitry 1010 may create a short-range communications network using a short-range communications protocol to connect to other devices. For example, the communications circuitry 1010 may be operative to create a local communications network using the Bluetooth® protocol to couple the computing device 1002 with a Bluetooth® headset.

It may be noted that the computing device is shown to have only one communication operation; however, those skilled in the art would appreciate that the computing device 1002 may include one more instances of the communications circuitry 1010 for simultaneously performing several communications operations using different communications networks. For example, the computing device 1002 may include a first instance of the communications circuitry 1010 for communicating over a cellular network, and a second instance of the communications circuitry 1010 for communicating over Wi-Fi or using Bluetooth®.

In an embodiment, the same instance of the communications circuitry 1010 may be operative to provide for communications over several communications networks. In an embodiment, the computing device 1002 may be coupled a host device for data transfers, synching the communications device, software or firmware updates, providing performance information to a remote source (e.g., providing riding characteristics to a remote server) or performing any other suitable operation that may require the computing device 1002 to be coupled to a host device. Several computing devices may be coupled to a single host device using the host device as a server. Alternatively or additionally, the computing device 1002 may be coupled to several host devices (e.g., for each of the plurality of the host devices to serve as a backup for data stored in the computing device 1002).

Common forms of non-transitory computer-readable storage medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer may read.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-program product for providing concurrent one or more buffer pools associated with a database of a database management system, comprising:
    a non-transitory computer readable storage medium having a computer program stored thereon for performing the steps of:
    creating one or more tables in each of the one or more buffer pools at runtime, wherein each of the one or more tables is a lockless table and wherein each of the one or more tables comprises a plurality of lockless slots;
    receiving a request simultaneously from a corresponding plurality of users for accessing a page of a plurality of pages stored in a buffer pool of the one or more buffer pools, wherein the request is received in form of a query, wherein the plurality of pages is requested from a corresponding slot of the plurality of lockless slots in a corresponding table of the one or more tables in the buffer pool; and
    enabling each of the plurality of users to access the corresponding page of the plurality of pages concurrently, wherein concurrent access is provided by locking each of a plurality of buffer headers,
    wherein each buffer header of the plurality of buffer headers corresponds to the page of the plurality of pages requested by a corresponding user of the plurality of users and wherein each buffer header is individually locked for allowing each of the plurality of users to access the corresponding page of the plurality of pages concurrently.

2. The computer-program product as recited in claim 1, wherein each of the plurality of pages is accessed through one or more lists in the buffer pool, wherein the one or more lists comprises a least recently used list, a dirty page list and a free list.

3. The computer-program product as recited in claim 2, wherein each of the one or more lists is accessed by the plurality of users concurrently.

4. The computer-program product as recited in claim 1, further comprising allowing each of the plurality of users to read a similar page in the buffer pool concurrently.

5. The computer-program product as recited in claim 4, wherein the concurrent access to the similar page is provided based on a pre-determined criterion.

6. The computer-program product as recited in claim 5, wherein the pre-determined criterion comprises identifying whether the similar page is accessed for reading or writing.

7. The computer-program product as recited in claim 1, further comprising computing a size of the buffer pool, wherein the size is computed for the creation of the one or more tables in the buffer pool.

8. The computer-program product as recited in claim 1, further comprising adding the plurality of pages in the dirty page list.

9. The computer-program product as recited in claim 8, wherein the plurality of pages is added when each of the plurality of pages are determined as dirty pages.

10. The computer-program product as recited in claim 8, wherein the plurality of pages is added when a previous buffer is not null.

11. A method for providing concurrent one or more buffer pools associated with a database of a database management system, the method comprising:
    creating one or more tables in each of the one or more buffer pools at runtime, wherein each of the one or more tables is a lockless table and wherein each of the one or more tables comprises a plurality of lockless slots;
    receiving a request simultaneously from a corresponding plurality of users for accessing a page of a plurality of pages stored in a buffer pool of the one or more buffer pools, wherein the request is received in form of a query, wherein the plurality of pages is requested from a corresponding slot of the plurality of lockless slots in a corresponding table of the one or more tables in the buffer pool; and
    enabling each of the plurality of users to access the corresponding page of the plurality of pages concurrently, wherein the concurrent access is provided by locking each of a plurality of buffer headers,
    wherein each buffer header of the plurality of buffer headers corresponds to the page of the plurality of pages requested by a corresponding user of the plurality of users and wherein each buffer header is individually locked for allowing each of the plurality of users to access the corresponding page of the plurality of pages concurrently.

12. The method as recited in claim 11, wherein each of the plurality of pages is accessed through one or more lists in the buffer pool, wherein the one or more lists comprises a least recently used list, a dirty page list and a free list.

13. The method as recited in claim 12, wherein each of the one or more lists is accessed by the plurality of users concurrently.

14. The method as recited in claim 11, further comprising allowing each of the plurality of users to read a similar page in the buffer pool concurrently.

15. The method as recited in claim 14, wherein the concurrent access to the similar page is provided based on a pre-determined criterion.

16. The method as recited in claim 15, wherein the pre-determined criterion comprises identifying whether the similar page is accessed for reading or writing.

17. The method as recited in claim 11, further comprising computing a size of the buffer pool, wherein the size is computed for the creation of the one or more tables in the buffer pool.

18. A method for providing concurrent one or more buffer pools associated with a database of a database management system, the method comprising:
    creating one or more tables in each of the one or more buffer pools at runtime, wherein each of the one or more tables is a lockless table and wherein each of the one or more tables comprises a plurality of lockless slots;

receiving a request simultaneously from a corresponding plurality of users for accessing a page of a plurality of pages stored in a buffer pool of the one or more buffer pools, wherein the request is received in form of a query, wherein the plurality of pages is requested from a corresponding slot of the plurality of lockless slots in a corresponding table of the one or more tables in the buffer pool; and enabling each of the plurality of users to access the corresponding page of the plurality of pages concurrently, wherein the concurrent access is provided by locking each of a plurality of buffer headers, wherein each buffer header of the plurality of buffer headers corresponds to the page of the plurality of pages requested by a corresponding user of the plurality of users and wherein each buffer header is individually locked for allowing each of the plurality of users to access the corresponding page of the plurality of pages concurrently; and allowing each of the plurality of users to read a similar page in the buffer pool of the one or more buffer pools concurrently based on a pre-determined criterion, wherein the pre-determined criterion comprises identifying whether the similar page is accessed for reading or writing.

19. The method as recited in claim 18, wherein each of the plurality of pages is accessed through one or more lists in the buffer pool, wherein the one or more lists comprises a least recently used list, a dirty page list and a free list.

20. The method as recited in claim 19, wherein each of the one or more lists is accessed by the plurality of users concurrently.

* * * * *